United States Patent [19]

Hatfield

[11] 4,020,478
[45] Apr. 26, 1977

[54] MOISTURE DETECTING DEVICE

[76] Inventor: Edward S. Hatfield, 1809 Arizona Ave., Fort Pierce, Fla. 33450

[22] Filed: Sept. 18, 1975

[21] Appl. No.: 614,416

[52] U.S. Cl. .............................. 340/235; 324/65 R
[51] Int. Cl.² ......................................... G08B 21/00
[58] Field of Search ...................... 324/65 R, 65 P; 340/235; 73/73, 336.5; 200/61.05, 61.06; 338/34, 35

[56] References Cited

UNITED STATES PATENTS

| | | | |
|---|---|---|---|
| 2,681,571 | 6/1954 | Becker | 73/73 X |
| 2,740,032 | 3/1956 | Bouyoucos | 324/65 R X |
| 2,907,841 | 10/1959 | Campbell | 340/235 X |
| 3,245,068 | 4/1966 | Wegryn et al. | 340/235 |
| 3,356,979 | 12/1967 | Bouyoucos | 324/65 P |
| 3,376,501 | 4/1968 | Peranio | 324/65 R X |
| 3,493,484 | 2/1970 | Berg et al. | 324/65 R |
| 3,548,660 | 12/1970 | Perlaky et al. | 73/336.5 X |

FOREIGN PATENTS OR APPLICATIONS

| | | | |
|---|---|---|---|
| 16,664 | 3/1956 | Germany | 324/65 P |
| 644,695 | 9/1962 | Italy | 324/65 P |

Primary Examiner—Stanley T. Krawczewicz
Attorney, Agent, or Firm—Malin & Haley

[57] ABSTRACT

A device for detecting the presence of excess moisture, water or other electrically conductive liquids in a given area which includes a visual or audio warning indicator. The device is characterized by non-complex, miniaturized circuitry and a housing that is mounted in a standard 115 Volt conventional, electrical outlet. A detachable liquid sensing unit includes a cellulose pad having a pair of electrodes embedded therein, encased between perforated sheets of plastic film with a connecting conductor having a phone-type jack which plugs into the power unit housing. The power supply and gate circuit includes a step-down transformer with its secondary connected to an alarm actuated by a thyristor which is made conductive by current flow between the sensor electrodes, the current being conducted by the presence of liquid in the sensor pad. The low current and voltage of the device allows it to be safely employed in a home or commercial environment without danger to persons in the vicinity of the device. The compactness of the device allows it to be placed in relatively inaccessible areas.

5 Claims, 3 Drawing Figures

MOISTURE DETECTING DEVICE

BACKGROUND OF THE INVENTION

This invention relates generally to a device for detecting the presence (or absence) of moisture, water or other electrically conductive liquids in a particular area, and specifically to a compact moisture detector utilizing low voltage and having low operational current for increased safety.

Water leaks and condensate accummulation are responsible for millions of dollars of losses annually in both the home and commercial environment. Many areas in the home or business are not readily accessible nor frequented often enough to determine water leaks or moisture build-up which may go undetected for a sufficient period of time to cause resultant damage. With the increased employment of multi-level buildings, such damage can be extremely expensive.

The present invention provides a device to protect against water damage by providing a liquid detector having an audio or visual alarm actuated by the presence of excess moisture, water or other liquids. Many of the devices found in the prior art for detecting water or other liquids are quite complicated in construction, bulky in size, and operate at high current values, restricting their usage to large areas away from personnel or children.

The present invention provides a moisture detecting device with extreme simplicity in construction and operation having the power supply, alarm, and gate curcuit compactly arranged in a relatively small housing, mountable directly on a standard 115 Volt electrical outlet, and includes a detachable liquid sensing unit which may be placed in relatively inaccessible areas. The power consumption of the device when in operation is minimal. The power supply includes a transformer which isolates the operating circuitry from the conventional outlet voltage, with step-down voltage making the device extremely safe. The device is especially useful in the detection of water leaks from relatively inaccessible pipes, water tanks, lavatory facilities, rain water detection, air conditioners and the like.

BRIEF DESCRIPTION OF THE INVENTION

A compact, plug-in device for detecting the presence of water, excess moisture or other liquids in a particular area comprising a housing having an electrical plug connected to one wall, a step-down transformer having its primary connected to the plug, a solid state switching device coupled to the secondary of the transformer, a remote liquid sensing means connected to the solid state switching device and an indicator means for providing an audio visual response whenever the switching means is actuated by moisture on the sensing means. The switching means in one embodiment may include a thyristor having one lead coupled to the sensing means which may be a cellulose pad having a pair of electrodes embedded therein with a plastic perforated film disposed over the pad. The audio alarm in one embodiment may be a Sonalert alarm which provides a siren-like tone and which is affixed to the housing of the device. The housing is constructed of metal or plastic of very small dimensions and includes a three-prong electrical plug connected to one wall. Thus, the liquid sensing unit may include any length conductor and may be deployed at any distance from the power unit housing.

In operation, the power unit and housing are mounted on a conventional wall outlet and the sensing unit is disposed in the particular area in which it is desired to detect excess moisture or water. The 115 Volt outlet voltage is reduced to 12 Volts operating voltage. Current conduction across the sensing pat between the sensing electrodes results whenever sufficient liquid is present to allow current flow, the sensing currrent turning on a thyristor which makes the alarm circuit conduct, actuating the alarm. The alarm is not actuated if there is not sufficient liquid present on the pad to provide conductivity for current flow.

It is an object of this invention to provide a compact, low current drain moisture detector which is readily usable in relatively inaccessible areas.

It is another object of this invention to provide a moisture detector which is mounted on a conventional wall plug outlet.

It is another object of this invention to provide an electrically powered liquid detecting device that is not hazardous to personnel in the areas of the detector.

But still yet another object of this invention is to provide an excess moisture detecting device of reduced complexity and reduced construction costs.

In accordance with these and other objects which will be apparent hereinafter, the instant invention will now be described with particular reference to the accompanying drawings.

PREFERRED EMBODIMENT OF THE INVENTION

Figure 1:
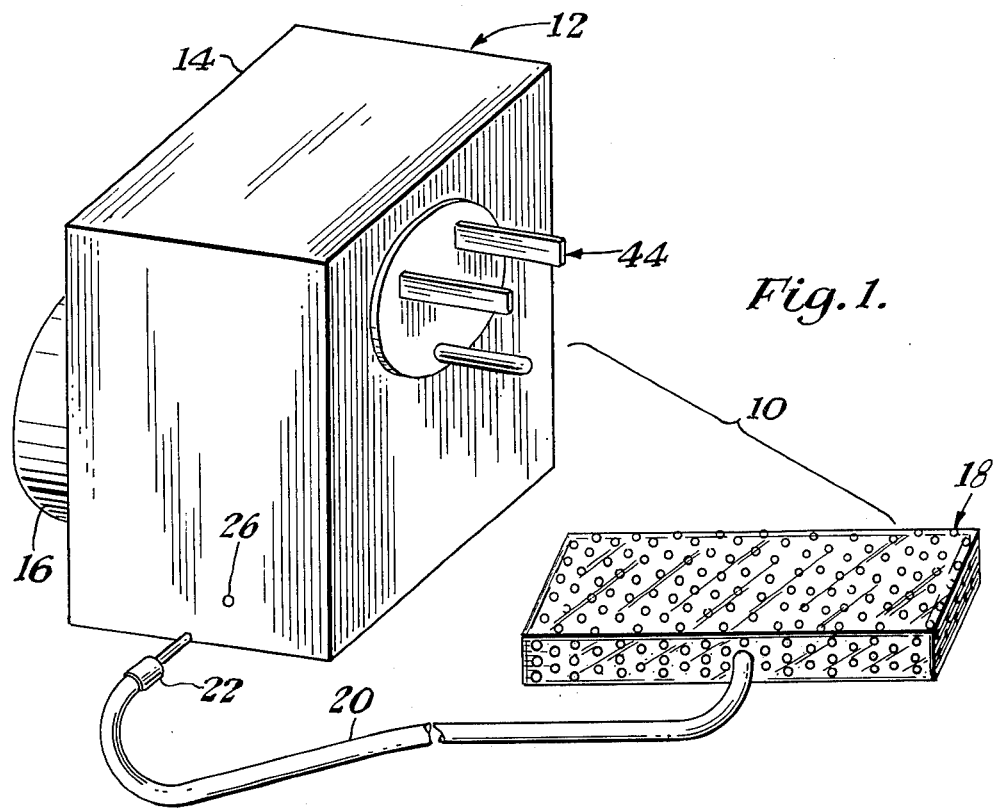
FIG. 1 shows the instant invention in perspective including the power unit and detachable remote sensor.

Referring now to the drawings and specifically to FIG. 1, Applicant's moisture detector is shown generally at 10, comprised of a power unit 12 (including circuitry and alarm) having a metal or plastic housing 14 which includes attached thereto audio alarm 16 coupled to housing 14. The power unit 12 includes an electrical female socket 26 for receiving a plug-in jack 22 attached to conductor 20 which is connected to the remote liquide sensing means 18, the sensing means being utilized to detect the presence of moisture. The housing 14 includes a three-prong electrical plug 44 which is receivable into a conventional electrical 115 Volt outlet for mounting the housing 14 on a wall outlet.

Figure 2:
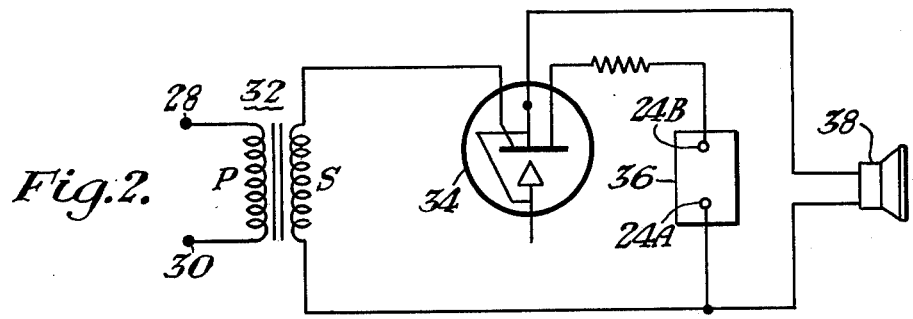
FIG. 2 shows a schematic circuit diagram of the operation of the instant invention.

The electrical circuitry of the device is shown in FIG. 2 including the inlet contacts 28 and 30 which are connected to plug 44 across the priary of step-down transformer 32. The secondary of transformer 32 has one conductor connected to one electrode 24A of sensing unit 36 and to an alarm 38. The other conductor from the secondary is connected into thyristor 34 with the gating conductor of the thyristor 34 connected to electrode 24B of the sensing unit 36. The output of thyristor 34 is coupled to the other lead of alarm 38.

In operation, the unit is plugged into and mounted on a conventional 115 Volt electrical outlet. Transformer 32 reduces the voltage and steps it down to 24 Volts. In the absence of moisture or liquid in sensor 36, no current flows between electrodes 24A and 24B making the thyristor 34 non-conductive. The presence of sufficent moisture in sensor 36 will provide sufficient conductivity for current flow between the electrodes 24A and 24B which then triggers thyristor 34, making it conductive, causing alarm 38 to be actuated. The alarm 38 may emit visual or audio signals and in one embodiment is a siren-type audio indicator alarm known under the trade name of SONALERT.

Figure 3:
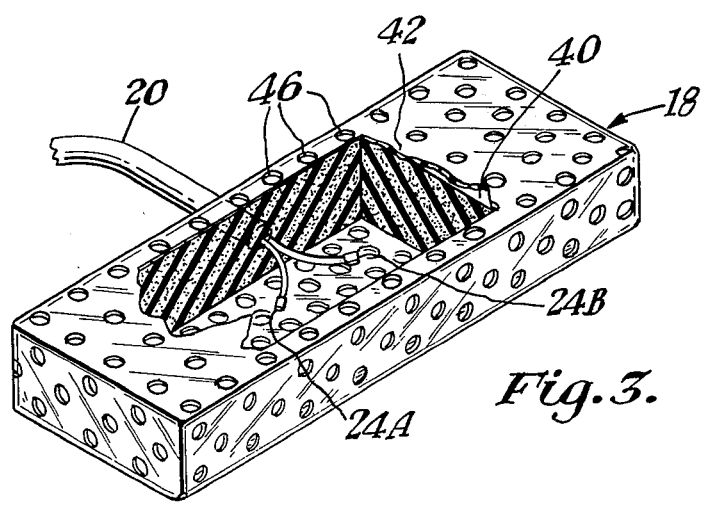
FIG. 3 shows a perspective view partially cutaway of the moisture sensor utilized with the instant invention.

FIG. 3 shows the liquid sensing unit that is remotely connected to the power unit (FIG. 1) by a conductor 20 having electrodes 24A and 24B embedded in a cellulose pad 40 encased in a thin, plastic perforated film 42. The plastic film 42 protects the cellulose pad 40 while still allowing moisture or water or other liquids to be received into the cellulose pad through apertures 46.

In an alternate embodiment, the device could be constructed such that it detects the absence of water. With slight modifications, the device may be constructed to actuate other electrical devices besides the alarm or indicator to effect the shutting off or regulation of particular other devices.

The instant invention has been shown and described herein in what is considered to be the most practical and preferred embodiment. It is recognized, however, that departures may be made therefrom within the scope of the invention and that obvious modifications will occur to a person skilled in the art.

What I Claim Is:

1. A device for detecting excessive moisture or absence of moisture in a particular area comprising:
    a rigid, closed housing, said housing having a plurality of walls;
    an electrical male plug connected to and projecting from one wall of said housing;
    step-down transformer within said housing having its primary connected to said electrical plug;
    thyristor gate means within said housing connected to the secondary of said transformer;
    means for receiving moisture including a circuit connected to said thyristor gate means having a first electrode connected to said transformer secondary and second electrode connected to said thyristor gate means, said first and second electrodes being coupled to said moisture receiving means and spaced apart; and
    electrically driven indicating means mounted to said housing connected to said secondary and said thyristor gate means whereby when moisture is received on said moisture receiving means a current across said first and second electrodes will actuate said thyristor gate providing power to said electrically driven indicator means.

2. A moisture detecting device, as in claim 1, including:
    electrical female jack disposed within said housing and electrically connected to said thyristor gate means and said transformersecondary;
    a jack plug electrically connected to said first and second electrodes.

3. A moisture detecting device, as in claim 2, wherein said sensing means includes:
    a moisture absobent pad, said first and said second electrodes being embedded in said pad; and
    a pad covering means having a plurality of apertures disposed therein allowing moisutre to be received into said absorbent pad.

4. A moisture detecting device, as in claim 3, wherein: said indicating means is connected to said housing.

5. A moisutre detecting device, as in claim 4, wherein: said indicating means is an audio alarm.

* * * * *